Aug. 24, 1943.   J. L. SEAT   2,327,744
SAFETY AIRPLANE
Filed Sept. 4, 1941   3 Sheets-Sheet 1
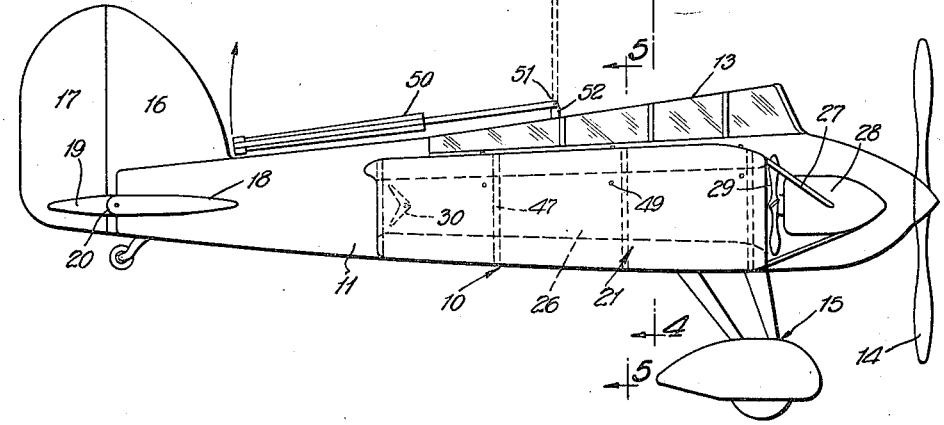
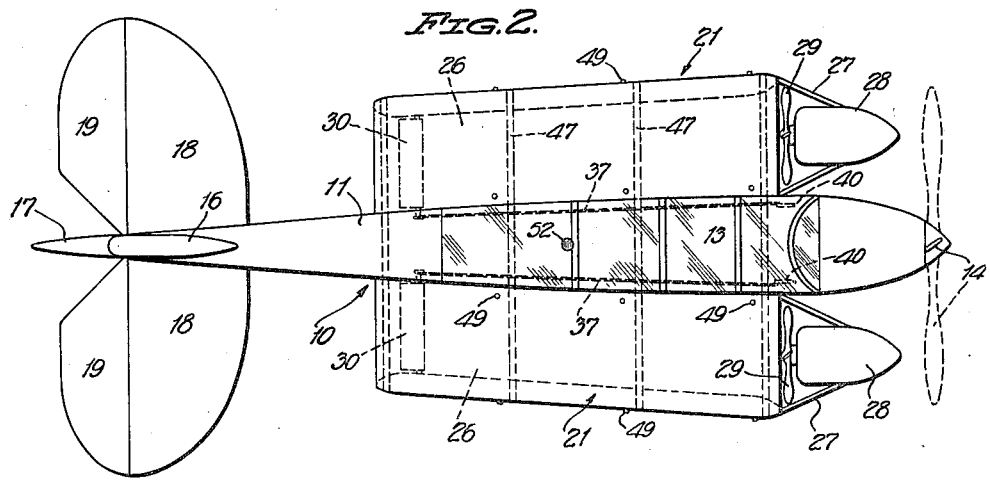
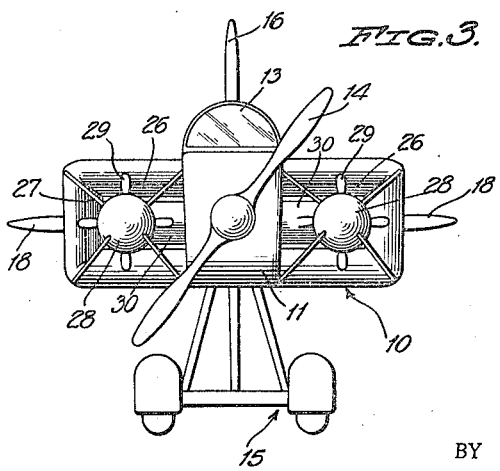
JAY LAWRENCE SEAT,
INVENTOR.
ATTORNEYS.

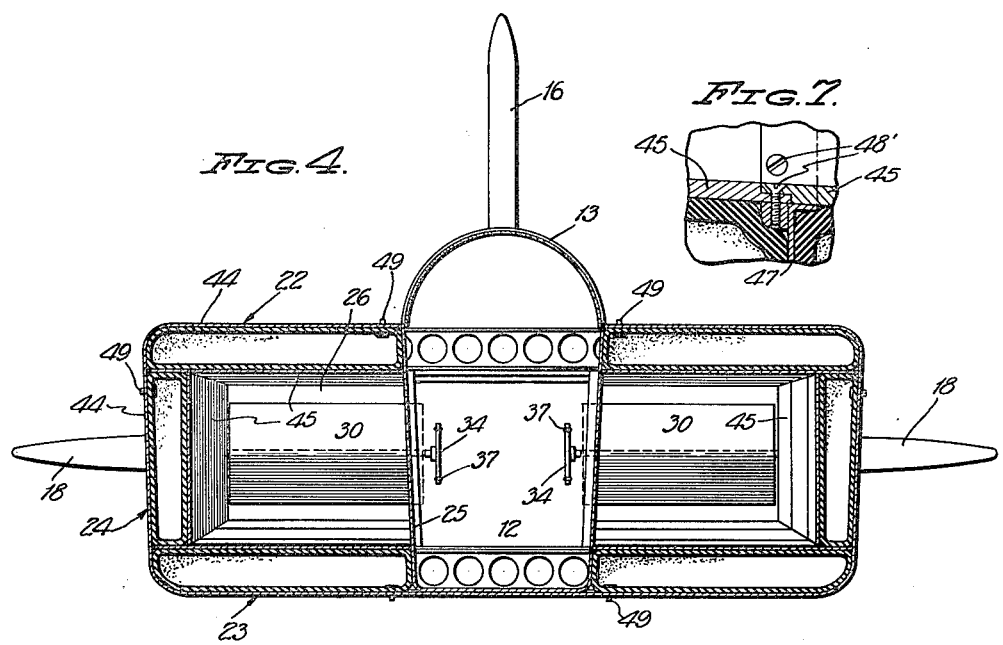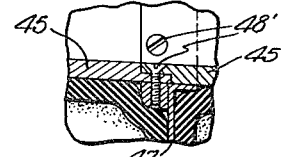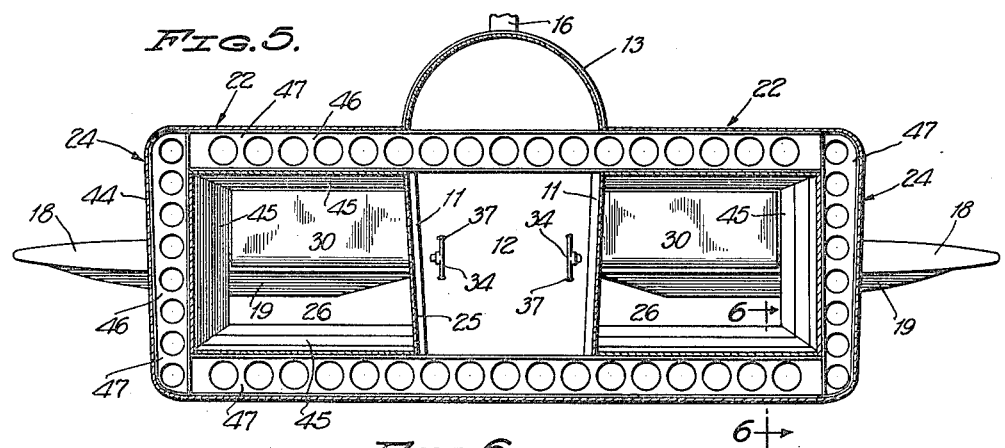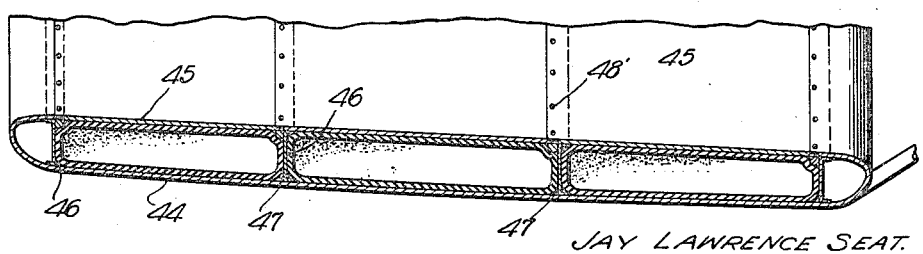

Aug. 24, 1943.    J. L. SEAT    2,327,744
SAFETY AIRPLANE
Filed Sept. 4, 1941    3 Sheets—Sheet 3
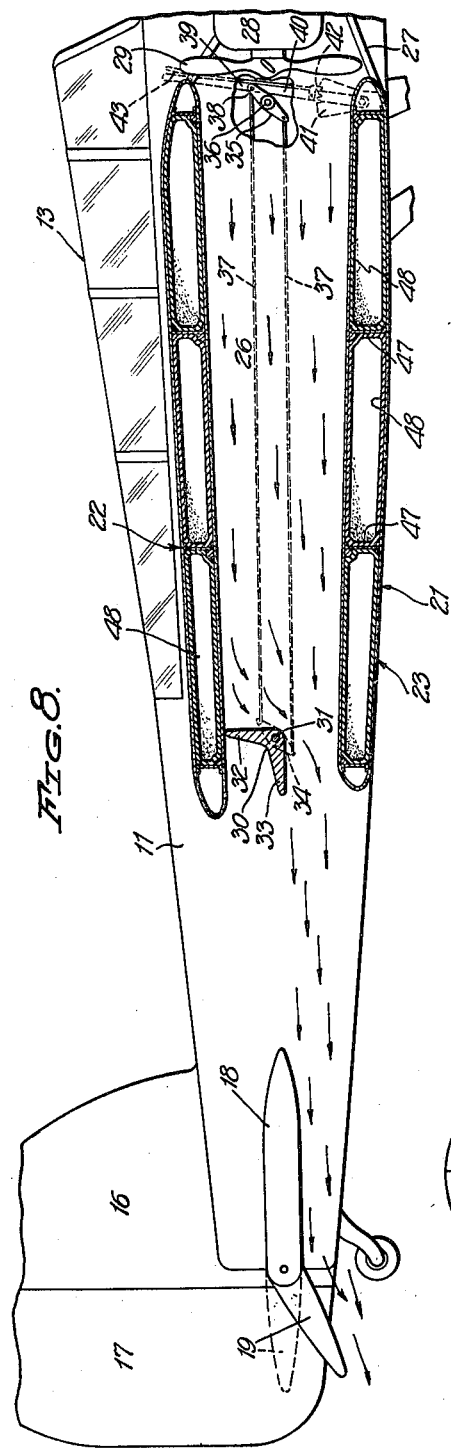
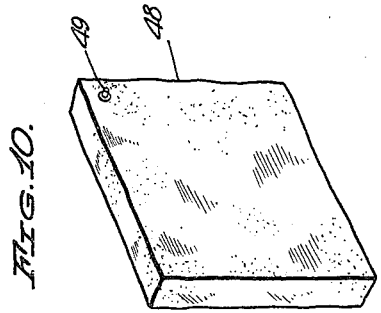
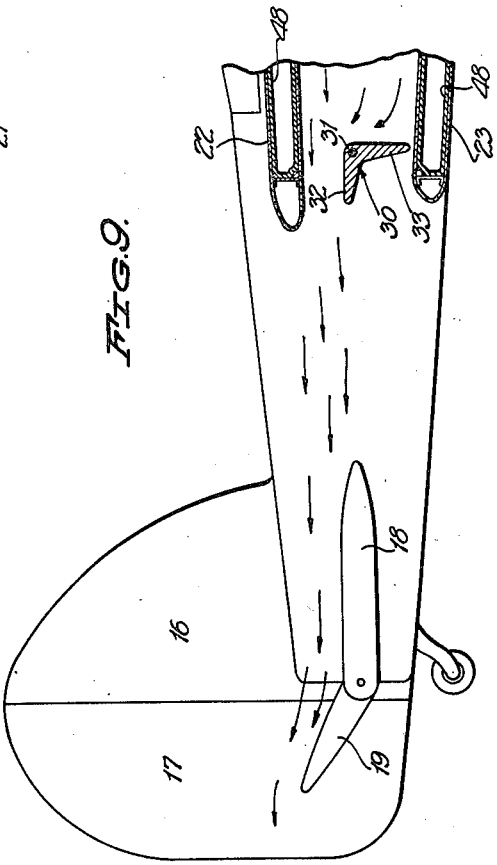
JAY LAWRENCE SEAT.
INVENTOR.

Patented Aug. 24, 1943

2,327,744

UNITED STATES PATENT OFFICE 2,327,744

SAFETY AIRPLANE

Jay Lawrence Seat, Portland, Conn.

Application September 4, 1941, Serial No. 409,599

3 Claims. (Cl. 244—15)

This invention relates to improvements in aircraft and more specifically to a safety airplane primarily intended for aerial combat use, although it may be used for commercial purposes as well.

One of the important features of the invention resides in an airplane in which the use of lengthy wings is eliminated, thus making the airplane a much smaller target for enemy gun fire and less vunerable to attack.

Another feature of the invention is to provide an airplane in which the suspension of the same in flight is dependent by the velocity of air streams which pass through air tunnels respectively disposed at opposite sides of the fuselage rather than by the conventional aerodynamic principle of relatively long cambered wings.

Another feature of the invention is the provision of an airplane in which the force of the air streams passing through the air tunnels is utilized for selectively controlling the lifting and lowering of the nose end of the airplane when in flight when the elevator rudders are manually moved to their up and down control positions.

A further feature of the invention is to provide a safety airplane in which the bouyancy thereof is increased by the use of gas bags arranged in cells provided in the walls of the air tunnels. The presence of the gas bags also causes the aircraft to remain afloat an indefinite period of time in the event of its becoming disabled and landing upon a body of water.

A still further feature of the invention is the provision of an airplane which is propelled by a pulling motor driven propeller located at the nose of the fuselage and by two motor driven pushing propellers located at the front ends of the air tunnels which tend to stabilize the airplane and propel it at a relatively high rate of speed.

Other novel features of the invention will become apparent as the following specification is read in conjunction with the accompanying drawings, in which:

Figure 1 is a side elevational view of the safety airplane, showing the auxiliary "Auto Gyro" attachment in lowered inoperative position in full lines and in raised position in dotted lines.

Figure 2 is a top plan view.

Figure 3 is a front elevational view.

Figure 4 is an enlarged vertical transverse sectional view on the line 4—4 of Figure 1.

Figure 5 is a view similar to Figure 4 but taken on the line 5—5 of Figure 1.

Figure 6 is a detail vertical longitudinal sectional view on the line 6—6 of Figure 5.

Figure 7 is an enlarged detail vertical sectional view through the removable cell plate fastening means.

Figure 8 is an enlarged detail vertical longitudinal sectional view through one of the air tunnels and illustrating the elevator rudder in down position and the air stream deflector in a position to deflect the air stream toward the elevator rudder.

Figure 9 is a fragmentary vertical longitudinal sectional view illustrating the elevator rudder in raised position and the air stream deflector in a position to direct the air stream to the rudder.

Figure 10 is a perspective view of one of the gas bags per se.

Referring to the drawings by reference characters, the numeral 10 designates my safety airplane in its entirety, which includes a fuselage 11 tapering from front to rear and which has the usual pilot and passenger compartment or cock-pit 12 closed by sliding windows 13. The front nose end of the fuselage 11 contains a motor for driving a propeller 14 of the pull type and which constitutes the power means by which the airplane is driven in flight. The fuselage supports the usual landing gear 15 which may be of the retractive type. The tail end of the airplane is conventional and includes the vertical tail fin 16 to which the vertical rudder 17 is pivotally connected and by which the airplane is steered left and right. Extending from opposite sides of the tail of the fuselage are horizontal stabilizer fins 18—18 to which the usual elevator rudders 19—19 are pivotally connected as at 20. The elevator rudders are swung up and down by the usual actuating means controlled from the pilot's compartment but it is not believed necessary to enter into a showing and description thereof.

Attached to opposite sides of the fuselage 11 and extending lengthwise thereof are tubular box-like or stub-wings 21—21. The front ends of the stub-wings 21—21 terminate short of the plane of the front nose end of the fuselage while the rear ends terminate short of the stabilizer fins 18 and in alinement therewith. The tubular stub wings 21—21 are identical in construction so that a description of one will suffice for the other.

Each tubular stub wing 21 includes hollow rearwardly converging top and bottom walls 22 and 23 respectively, and a hollow side wall 24 which converges rearwardly relative to the adjacent side wall 25 of the fuselage 11. The walls 22, 23, 24, and 25 cooperate to provide an air tunnel 26 which is square in cross section and which tapers from front to rear. The corners of the stub wings 21 are rounded and the front and rear edges cambered to reduce wind resistance when in flight.

Mounted upon supports 27 at the front air inlet end of each stub wing 21 is a motor 28 which drives a four blade push type propeller 29, the rotating plane of the propeller being just beyond the plane of the front edge of the wing so as to be disposed outside of and closely adjacent the front air inlet end of the air tunnel 26. The motor driven push propellers 29 cooperate with the pull type propeller 14 to propel the airplane in flight, and to further set up high velocity air streams through the air tunnels 26, from front to rear.

The air streams passing through the air tunnels 26—26 are discharged through the reduced rear end thereof and the discharge of the air streams are controlled to cause the same to pass either above or below the horizontal plane of the horizontal fins 18—18 so as to forcibly act upon the elevator rudders 19—19 when they are swung to raised and lowered positions relatively to effect a more rapid response in effecting descending and rising of the airplane in flight. For thus selectively controlling the directional discharge flow of the air stream, each air tunnel 26 has an air flow controller member 30 fixedly mounted therein on a shaft 31 adjacent the rear thereof. The shaft 31 extends transversely through the air tunnel and is mounted in opposite side walls thereof and disposed on a plane in alinement with the longitudinal axis of the air tunnel. The air controller member 30 is substantially L-shaped in cross section to provide a pair of angularly disposed baffle walls 32 and 33 which extend the width of the air tunnel and which are of a height equal to one-half the height of the air tunnel. When the member 30 is swung to a position with the wall 32 extending vertically as shown in Figure 8, the upper half of the discharge end of the air tunnel is shut off and the air stream is caused to pass through the lower half thereof, whereupon the air stream is directed to a plane below the underside of the rearwardly disposed fin 18 to forcibly act upon the elevator rudder 19 when it is in down position to effect a descent of the airplane. Conversely, when the member 30 is swung to the position shown in Figure 9, the baffle wall 33 is in a vertical position with the baffle wall 32 in a horizontal position and extending rearwardly. The baffle wall 33 shuts off the flow of air at the lower half of the air tunnel and exposes the upper half for the discharge passage of the air stream to direct it over the top of the fin 18 and against the elevator rudder 19 when the latter is in its up position to assist in causing the airplane when in flight to ascend.

Individual actuating means is provided for respectively controlling the actuations of the members 30 from the pilot's compartment. Each individual actuating means includes a cross arm 34 fixed to the inner end of the shaft 31. A similar cross arm 35 is turnably mounted on a shaft or pivot 36 at the front of the compartment 12, and which arm is in longitudinal alinement with the arm 34. Connecting rods 37—37 are pivotally connected to the respective top and bottom ends of the two related cross arms 34 and 35. The upper end of the arm 35 has its pivot pin 38 extending into a slot 39 provided in a hand actuated lever 40. The lever 40 may be locked in either a neutral position at which time the air control member 30 is in the position shown in dotted lines in Figure 1, or in either of its two extreme air baffling positions illustrated in Figures 8 and 9. The locking means includes a fixed notched segment plate 41, a spring pressed latch bolt 42 engageable with the notches of the segment plate, retractable by a pivot hand lever 43. The hand actuating levers 40—40 are disposed at opposite sides of the pilot in the compartment 12 and by the operation of which the baffle members 30—30 may be selectively moved to their desired position by pushing forwardly or rearwardly upon the levers 40—40.

The velocity of the air streams passing through the tunnels 26—26 is primarily for supporting the airplane in flight in lieu of the usual lengthy wings now used for such purpose, however, the force of the discharge of the air streams is used for forcibly acting upon the upper and lower sides of the elevator rudders to assist in producing a rapid response in effecting descent and ascent of the airplane in flight.

The walls 22, 23, and 24 of each tubular stub wing are hollow and each consists of an outer sheet metal wall section 44 and spaced removable overlapping metal plates 45 which constitute the inner wall sections. Each plate 45 covers a gas bag compartment or cell 46 which are formed by transverse partitions 47 extending transversely of the spaced inner and outer walls. The plates 45 are fixedly secured in position by screws 48' as shown in detail in Figure 7. Each compartment or cell 46 contains an inflated gas bag 48, the filling check valve 49 of which extend through the outer wall sections so as to be available for inflation as and when desired. Although many light gases may be placed in the gas bags 48, I prefer helium gas, due to its non-explosive safety feature when mixed with oxygen. These cells containing bags of light gas also tends to buoy the airplane when in flight, and although one or several may be accidentally punctured and deflated of gas by shell fire when the plane is used in aerial warfare, the remaining inflated gas bags will continue to impart stability to the airplane. Also, should the airplane 10 be forced down to a landing on a body of water, the inflated gas bags will provide the necessary buoyancy to keep the airplane afloat for an indefinite period of time. The gas bags 48 may be made of puncture-proof rubber of the kind which automatically seals itself if pierced.

Although not essential to the invention hereinbefore described, I provide an "Auto-Gyro" attachment 50 to the airplane 10, the same being pivoted at 51 to a post 52 rising from the fuselage 11. The attachment 50 is shown in a rearwardly inoperative collapsed position in Figure 1 in full lines and in operative upright position in dotted lines. The construction and operation of the "Auto-Gyro" principle is well known and it is not believed necessary to specifically describe the same. This attachment has been shown to indicate its use for safety reasons with the airplane 10 specifically shown and described hereinbefore.

While I have shown and described the essential features of my invention, it is understood that such changes in form and aerodynamic design as come within the scope of the appended claims may be resorted to if desired without departing from the spirit of the invention.

Having thus described the invention, what I claim as new and desire to secure by Letters Patent of the United States is:

1. In an airplane having a fuselage provided with elevator rudders at the rear end thereof, air tunnels disposed at the sides of the fuselage and extending lengthwise thereof, each of said air tunnels comprising a bottom wall, a top wall, and opposed side walls extending the length thereof, said air tunnels having their rear ends terminating short of the respective elevator rudders but in alinement therewith, motor driven push propellers mounted at the front ends of the air tunnels for producing air streams of relatively high velocity through said air tunnels in a front to rear direction, and air deflector means at the rear ends of the air tunnels for selectively directing the air streams leaving the tunnels to a plane above or below the elevator rudders to act thereagainst when the elevator rudders are swung to their up or down positions.

2. In an airplane having a fuselage and a pilot's compartment therein, air tunnels disposed at the opposite sides of the fuselage converging from front to rear, each of said air tunnels being of rectangular shape in cross section motor driven push propellers mounted at the open end of the air tunnels, L-shaped air stream deflector members turnably mounted in the respective air tunnels at the rear thereof, and individual actuating means controlled from the pilot's compartment for respectively controlling the positions of the deflector members to regulate the path of the air streams as they are discharged at the rear end of said air tunnels.

3. In an airplane as set forth in claim 2, including elevator rudders provided at the rear end of the fuselage in alinement with and spaced from the rear air discharge ends of the respective air tunnels and movable into the plane of the selective path of the air streams controlled by the air deflector members whereby the discharged air streams forcibly act upon the upper and under sides of the elevator rudders substantially as and for the purpose specified.

JAY LAWRENCE SEAT.